Oct. 2, 1951 — J. M. HOPWOOD — 2,569,992
SPRAY NOZZLE
Filed Jan. 15, 1947
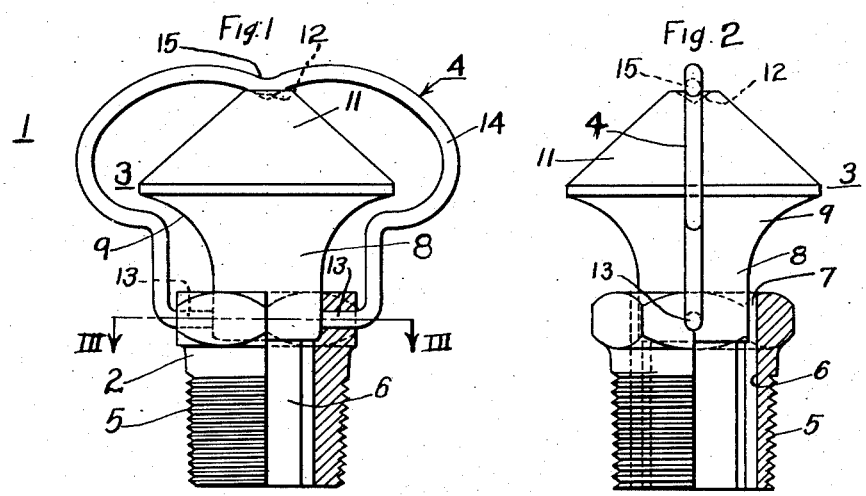
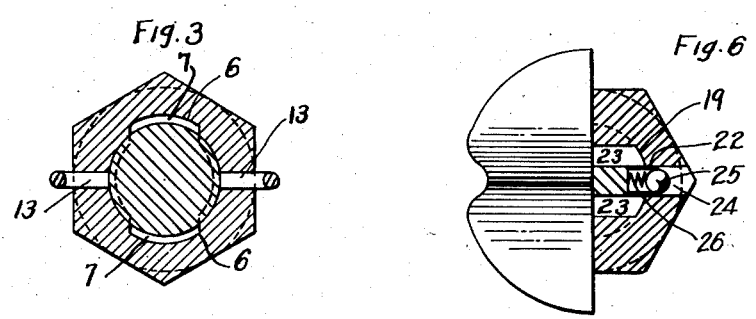
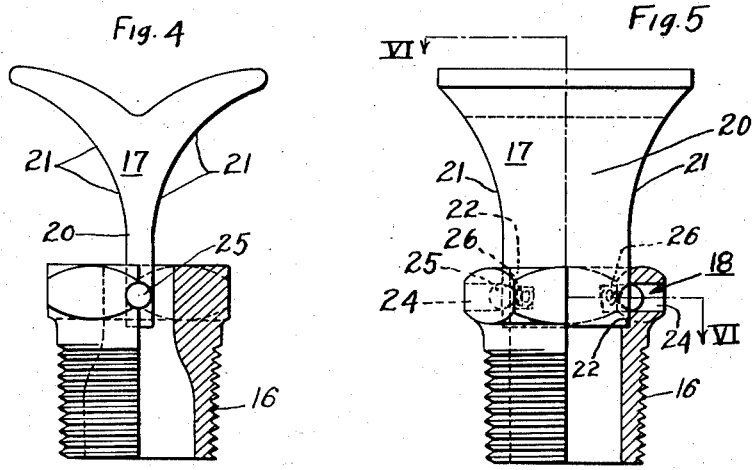
INVENTOR
John M. Hopwood
BY Gerald B. Tjoflat
His ATTORNEY Patented Oct. 2, 1951

2,569,992

UNITED STATES PATENT OFFICE 2,569,992

SPRAY NOZZLE

John M. Hopwood, Mount Lebanon, Pa., assignor to Hagan Corporation

Application January 15, 1947, Serial No. 722,101

2 Claims. (Cl. 299—121)

This invention relates to spray nozzles and more particularly to nozzles adapted for effective distribution of water for irrigation or agricultural purposes.

An object of this invention is to provide a spray nozzle which is so designed that water will be distributed effectively over soil areas or other areas to be watered.

Another object of the invention is to provide a spray nozzle of such construction and arrangement that it has a minimum of parts and may be easily and quickly disassembled for the removal of foreign matter such as grass, weeds, etc., and easily and quickly reassembled.

Other objects of the invention will, in part, be apparent and will, in part, be obvious from the following description taken in conjunction with the accompanying drawings in which:

Figure 1 is a view in elevation, partly in section, of a spray nozzle embodying the invention;

Fig. 2 is a view similar to Fig. 1, but turned 90°, of the nozzle shown in Fig. 1;

Fig. 3 is a view in section taken on line III—III of Fig. 1;

Fig. 4 is a view in elevation, partly in section, of a modified form of nozzle embodying the invention;

Fig. 5 is a view similar to Fig. 4 but turned 90°, part of the nozzle being in section; and Fig. 6 is a top plan view of the nozzle illustrated in Fig. 5, a part of the nozzle being in section taken on line VI—VI of Fig. 5.

Throughout the drawings and the specification like reference characters indicate like parts.

In Figs. 1 to 3 a spray nozzle 1 embodying one form of the invention is shown that comprises a body 2, a spray head 3 and a bail 4 constituting a means for securing the spray head in place on the body and providing for quick and easy removal of the spray head for cleaning the same.

Body 2 is hollow and formed with threads 5 whereby the nozzle may be screwed into a water distribution pipe (not shown). The discharge end of the body is provided with a substantially circular opening or socket having recesses or slots 6. Slots 6 are disposed on opposite sides of the body and form with the spray head, discharge openings 7 through which spray water issues. Slots 6 may be cut the full length of the body if it is convenient to do so in the manufacture thereof.

The spray head 3 comprises a shank 8 and a spray surface 9. Surface 9 flares upwardly and outwardly from shank 8, the surface being substantially an inverted paraboloid. Upper part 11 of the spray head, may for convenience be substantially conical in shape, the apex of which may be formed with a locking depression 12.

The ends of bail 4 are bent inwardly to be received in holes 13 formed in opposite sides of body 2. The loop portion 14 of the bail is large enough to pass over the spray head when turned in its bearing holes 13. The middle portion of the bail loop is bent downwardly as at 15 so that, when the bail is in locking position, it will spring into the depression 12 in the top of the spray head and hold it in place in body 2.

The lower end of spray head shank 8 is substantially circular in section but slightly tapered so that it has a snug fit with the opening in the discharge end of body 2. When the shank is seated in the body, the discharge openings 7 are formed. As may be seen in Fig. 3, these openings have a substantially constant width. Streams of water issuing from these openings discharge against the deflector surfaces of the spray head and are caused to fan out in opposite directions as a wide and well distributed spray, which insures good wetting of the ground or areas being watered.

As may be seen in Figs. 2 and 3, bail 4 is disposed at right angles to the sprays and does not interfere therewith.

In Figs. 4, 5 and 6 a modified form of spray nozzle is shown that comprises a body 16 and a spray head 17 provided with means 18 hereinafter more specifically described, for securing the spray head in place on the body. The body 16 is similar to the body 2 of the spray nozzle shown in Figs. 1, 2 and 3 in that it is exteriorly threaded so that it may be screwed into a water distribution pipe. It differs from body 2 in that opening 19 in the discharge end of the bore of the body is substantially rectangular in section, that is, the discharge opening is substantially rectangular in section.

Spray head 17 comprises a shank 20 having upwardly and outwardly curved surfaces 21 on opposite sides of the shank. As seen in Fig. 4 the shape of the spray head in transverse section is substantially that of a modified T, the ends of the cross bar being connected to the vertical leg of the T by the curved surfaces 21, the curvature of which, if desired, may be substantially parabolic. The opposite ends of the rectangular opening 19 in body 16 are provided with recesses or sockets 22 to receive the lower end of the spray head shank, thus dividing the rectangular opening 19 into a pair of discharge openings 23 disposed on opposite sides of the shank and through which streams of water may issue. These streams are directed against the surfaces 21 and caused to spread out in opposite directions from the spray head into fine and well distributed sprays.

The means 18 indicated for securing the spray head in place comprises a pair of transverse openings 24 in the upper end of body 16 which cooperate with locking balls 25 carried in recesses in the lower end of the shank of the spray head in which springs 26 are disposed for urging the balls outwardly into register with the locking openings 24. The spray head may be removed from the body 16 by merely pressing the balls inwardly and pulling the spray head out of the openings 24.

The spray nozzles shown on the drawings may be employed for irrigating orange groves, lawns or other areas requiring irrigation. In this type of operation distribution pipes (not shown) are laid over the areas to be irrigated. These pipes have the spray nozzles screwed into them at predetermined spaced points to insure uniform irrigation of the soil. Since the application of the spray nozzles for watering or irrigation purposes is so well understood, it is believed unnecessary to illustrate a distribution pipe or pipes with these nozzles screwed into the same at the desired or necessary points.

The water used for irrigation purposes is likely to have grass, weeds, fine roots, etc., in it. These foreign bodies if carried to the spray nozzles are likely to plug them. By reason of the construction of the nozzles shown herein, the spray heads are readily removable to permit removal of such foreign matter.

Having thus described the invention, what I claim as new and desire to secure by Letters Patent is:

1. A spray nozzle comprising a hollow tubular body having openings at each end, one end being threaded whereby the body may be threaded into a pipe carrying liquid under pressure, and a spray head having a shank, said head having deflector surfaces disposed on opposite sides thereof, the shank extending into the opening of said body opposite the pipe end, said hollow body having grooves on diametrically opposite sides thereof which with said shank form discharge openings, the deflector surfaces on said head being contiguous to said discharge openings and curved outwardly from said shank, whereby said deflecting surfaces act to convert the streams of fluid issuing herefrom into sprays, and a bail for securing the spray head to the body, said bail having its ends hinged in the body and the loop of said bail extending over and across the top of said head, the bail pressing resiliently on said head to retain it in place in said body, the plane of the bail when in such position being substantially at right angles to the plane of the sprays issuing from said nozzle.

2. A spray nozzle comprising an open-ended hollow body having threads at one end and a socket at the other end communicating with the interior of said body, and a spray head having a shank, one end of which is disposed in said socket, and outwardly flared wall surfaces joining said shank and head, the end of the shank in said socket being substantially circular in transverse section, and the walls of said socket being provided with slots that form with said shank flow passageways when the shank is seated in the socket, said passageways being in communication with the interior of said body and disposed to direct fluid against said flared surfaces, and means for removably securing said spray head to said body, said flared surfaces converting streams of fluid issuing from said flow passageways into sprays.

JOHN M. HOPWOOD.

REFERENCES CITED

The following references are of record in the file of this patent:

UNITED STATES PATENTS

| Number | Name | Date |
|---|---|---|
| 518,560 | Black | Apr. 17, 1894 |
| 748,608 | Hueni | Jan. 5, 1904 |
| 1,071,381 | Anthony | Aug. 26, 1913 |
| 1,288,123 | Mowry | Dec. 17, 1918 |
| 1,296,542 | McConnell | Mar. 4, 1919 |
| 1,646,299 | Mandry | Oct. 18, 1927 |
| 1,763,980 | Nelson | June 17, 1930 |
| 1,791,294 | Ware | Feb. 3, 1931 |
| 1,855,888 | Nedbor | Apr. 26, 1932 |
| 1,934,359 | Lagerholm | Nov. 7, 1933 |
| 1,943,073 | Heverly et al. | Jan. 9, 1934 |
| 2,118,943 | Price et al. | May 31, 1938 |
| 2,190,639 | Wittek | Feb. 13, 1940 |
| 2,337,298 | Nedbor | Dec. 21, 1943 |

FOREIGN PATENTS

| Number | Country | Date |
|---|---|---|
| 17,777 | Switzerland | Sept. 15, 1898 |